United States Patent [19]
Osmundsen et al.

[11] 3,767,973
[45] Oct. 23, 1973

[54] SHIELDED METAL ENCLOSED LIGHTNING ARRESTER

[75] Inventors: Norman K. Osmundsen; John E. Harder, both of Bloomington, Ind.; Tohei Nitta, Amagasaki, Japan

[73] Assignee: Westinghouse Electric Corporation, Pittsburgh, Pa.

[22] Filed: Oct. 11, 1972

[21] Appl. No.: 296,720

[52] U.S. Cl.................. 317/62, 315/36, 317/70
[51] Int. Cl. ............................................. H02h 9/06
[58] Field of Search................... 317/61, 62, 70; 315/36

[56] References Cited
UNITED STATES PATENTS

| | | | |
|---|---|---|---|
| 3,099,770 | 7/1963 | Sorrow et al. | 317/62 X |
| 3,624,450 | 11/1971 | Graybill | 317/62 |
| 3,649,875 | 3/1972 | Nagai et al. | 317/70 X |

Primary Examiner—James D. Trammell
Attorney—A. T. Stratton et al.

[57] ABSTRACT

A high voltage lightning arrester enclosed in a grounded metal enclosure containing a pressurized insulating gas. The arrester is provided with an asymmetrical shield and grading means to control the voltage distribution across the arrester.

10 Claims, 6 Drawing Figures

SHIELDED METAL ENCLOSED LIGHTNING ARRESTER

BACKGROUND OF THE INVENTION

The present invention relates to high voltage lightning arresters enclosed in a grounded metal enclosure and insulated by a pressurized gas, and more particularly to means for controlling the voltage distribution across such an arrester.

More generally, the invention relates to high voltage, metal enclosed, gas insulated electrical systems. In such systems, the conductors or busses are enclosed in tubular metal enclosures filled with a pressurized gas of suitable properties such as sulphur hexafluoride. Associated devices such as circuit breakers, isolators, grounding switches and the like are also contained in metal enclosures so that a complete substation, or this electrical system, can be made up of components contained in communicating metal enclosures and insulated by the pressurized gas. Such a system permits a substantial reduction in the space required, as well as increased reliability and safety and reduced maintenance, with the further advantage that it lends itself well to a modular design approach with resulting low installation costs.

The pressurized gas insulation used in these systems permits relatively close clearances between the grounded metal enclosure and the high voltage equipment contained within the enclosure. When a high voltage, such as the line to ground system voltage, is applied across a device in such close proximity to a grounded surface, however, the electric field is badly distorted and the performance of devices such as lightning arresters is adversely affected by the resulting non-uniformity of voltage distribution. Other devices such as coupling capacitors, for example, may also be adversely affected by non-uniform voltage distribution resulting from the relatively small clearance to adjacent grounded metal surfaces. Lightning arresters have been used in metal enclosures at relatively low voltages as in Harder U.S. Pat. No. 3,469,146, and have been proposed for high voltage, gas insulated systems as in Graybill U.S. Pat. No. 3,624,450, but no means for controlling the voltage distribution in such an arrangement has been available, except the conventional grading rings. Such grading rings are applied to the line terminal, and for high voltage arresters they can be of very large size and high cost and do not necessarily result in the desired voltage distribution. Furthermore, they are not desirable for a metal enclosed system because of the large amount of space which they require.

SUMMARY OF THE INVENTION

The present invention provides a means for controlling the voltage distribution across a lightning arrester enclosed in a grounded metal enclosure so as to obtain substantially uniform voltage distribution.

In a copending U.S. Pat. application of T. Nitta, Ser. No. 296,716, filed Oct. 11, 1972 and assigned to the assignee of the present invention, there is disclosed an asymmetrical shielding means for controlling the voltage distribution on high voltage equipment used in metal enclosed, gas insulated systems. The present invention provides a construction for a shield of this general type utilizing elongated members of varying length extending axially on one side of the arrester in combination with an arcuate shield member encircling the top or line terminal end of the arrester, to control the capacitances to ground along the length of the arrester. Grading means, such as a series of rings spaced apart along the length of the arrester, is used to maintain a symmetrical field within the arrester itself and together with the asymmetrical shield formed by the elongated members provides very effective means for controlling the voltage distribution to obtain substantial uniformity of voltage distribution. An arrester of standard design and construction can thus be utilized and its performance will be essentially the same as in the more usual outdoor environment.

BRIEF DESCRIPTION OF THE DRAWINGS

The invention will be more fully understood from the following detailed description, taken in connection with the accompanying drawings, in which.

DESCRIPTION OF A PREFERRED EMBODIMENT

Figure 1:
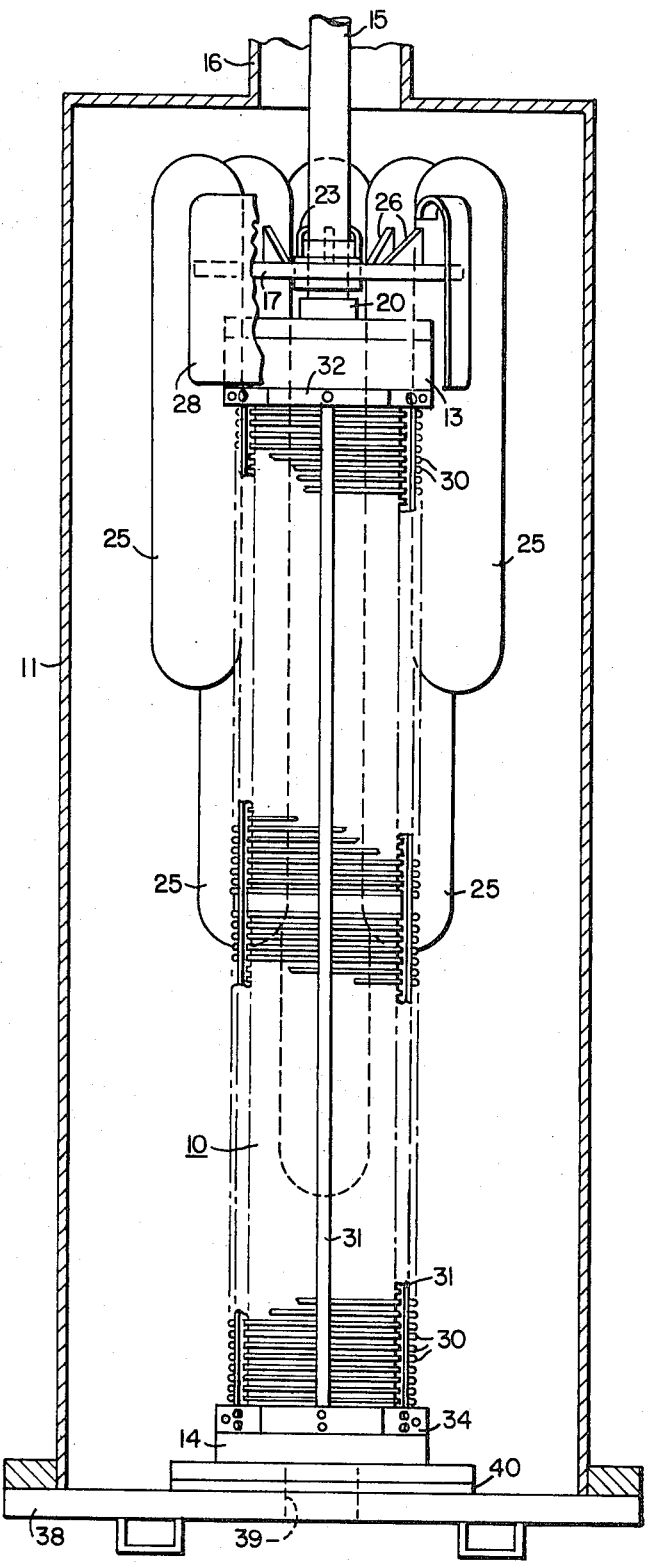
FIG. 1 is a front view in elevation and partially broken away showing a shielded arrester enclosed in a metal enclosure.

There is shown in the drawings a shielded, high voltage, metal enclosed lightning arrester embodying the principles of the invention. As there shown, a lightning arrester 10 is disposed within a metal enclosure 11 which would normally be grounded and which is generally cylindrical to enclose the arrester 10 with a clearance between the enclosure and the arrester. The enclosure 11 is filled with a suitable insulating gas such as sulphur hexafluoride at a pressure of 45 psig, although other suitable gases or pressures might be used. The pressurized gas insulation makes possible a relatively small clearance between the enclosure and the arrester and thus reduces the space required for the installation. It will be understood that the metal enclosed, gas insulated systems to which the invention relates are primarily intended for use in substations on high voltage transmission systems. Thus, these gas insulated systems have been designed for voltages in the range of 69 KV to 345 KV, for example, although they may obviously be used for other voltages. At these high voltages, the saving in space due to the reduced clearances is very significant. The relatively small clearances to ground, however, result in the problem of non-uniform voltage distribution mentioned above which would adversely affect the performance of lightning arresters and certain other devices, such as coupling capacitors.

The arrester 10 has not been illustrated in detail as it may be any standard or conventional type of high voltage lightning arrester consisting of a suitable assembly of spark gaps and valve blocks. A suitable construction and arrangement is shown, for example, in the patents to Kennon U.S. Pat. No. 3,534,221 and Osterhaut et al. U.S. Pat. No. 3,611,044 although any suitable construction might be utilized. The arrester 10 is contained in a generally cylindrical housing 12 of porcelain or other suitable insulating material and which may have a smooth exterior surface. The arrester is closed by a metal end cap 13 at the upper end which serves for connection to a line terminal and by a metal end cap 14 at the bottom for connection to ground. A line conductor 15 which may be a rod-like member, either solid or tubular, is connected to the end cap 13 as more fully described hereinafter for connection to the equipment to be protected by the arrester, and the conductor 15 is contained in a tubular metal enclosure 16 which communicates with the enclosure 11 and forms part of a complete metal enclosed substation or other electrical system.

In the conventional use of a lightning arrester such as the arrester 10, it is supported on a substation structure or platform support, or other grounded supporting structure of some type, usually in the open air. The voltage distribution across the arrester is then substantially uniform, or can be made sufficiently uniform by conventional grading rings, and the performance of the arrester is determined on that basis. In the usual outdoor installation, the voltage distribution may be affected by stray capacitances to ground but most of the arrester is sufficiently remote from the grounded supporting structure that these capacitances are relatively small and do not seriously affect the voltage distribution. When the arrester is enclosed in a metal enclosure 11 as in FIG. 1, however, the presence of a grounded conducting surface in close proximity to the arrester over its entire length has a serious effect on the voltage distribution if no means are provided to control the electric field. The clearance between the enclosure 11 and the arrester 10 is necessarily relatively small in order to obtain the advantages of the metal enclosed system discussed above, and the capacitances to ground between the arrester and the enclosure 11 are therefore correspondingly large so that the electric field is seriously distorted. The performance of a standard arrester would be adversely affected by the resulting non-uniformity of voltage distribution.

In accordance with the present invention, there is provided an asymmetrical shield of the general type disclosed in the above mentioned Nitta application to control the voltage distribution across the arrester and thus permit the satisfactory use of a high voltage arrester of standard design.

Figure 2:
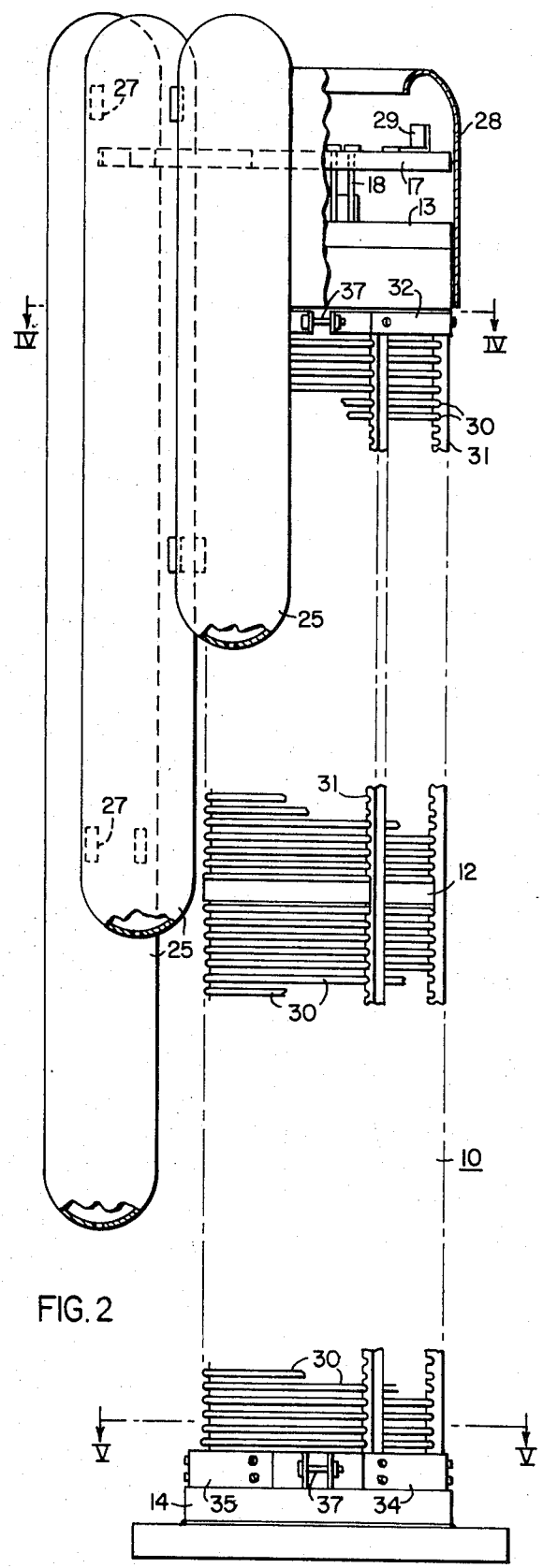
FIG. 2 is a side view of the arrester and shield.
Figure 3:
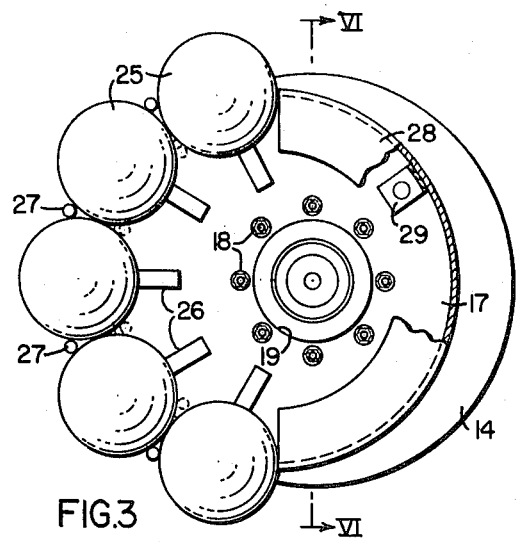
FIG. 3 is a top plan view of the arrester.
Figure 6:
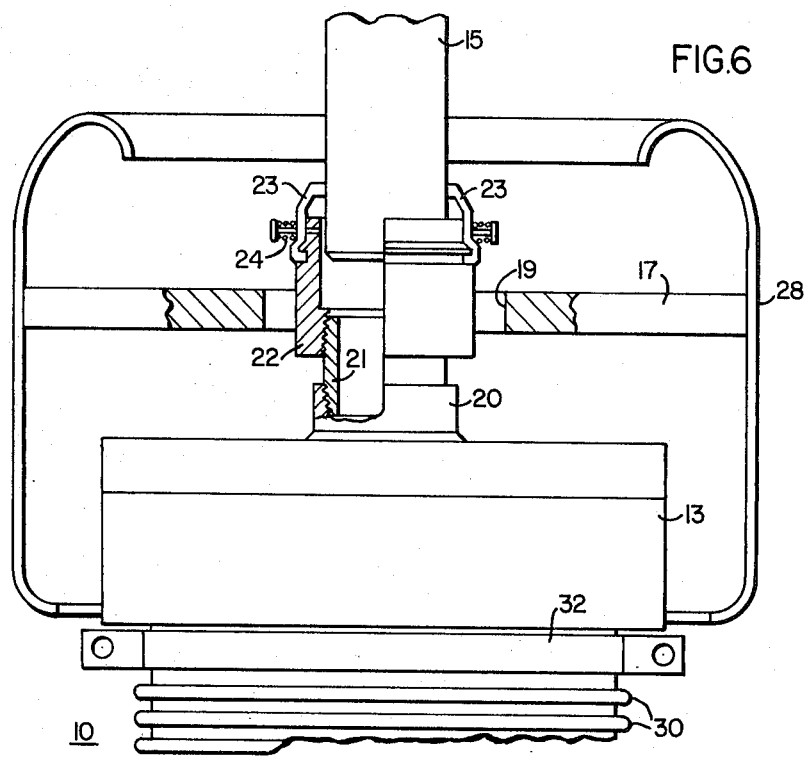
FIG. 6 is a fragmentary elevation view of the line terminal and upper end of the arrester, partially in section on the line VI—VI of FIG. 3.

As shown in FIGS. 1 and 2, the shield is supported on a plate 17 which may be made of steel or other conducting material. The plate 17 is supported on the top end cap 13 of the arrester 10 by means of a plurality of bolts 18 which extend through the plate 17 and support it in vertically spaced relation from the end cap 13. It will be noted, as seen in FIGS. 2 and 3, that the plate 17 is circular and is eccentric with respect to the vertical axis of the arrester 10, and has an opening 19 therethrough which is substantially concentric with the vertical axis. As shown more clearly in FIG. 6, the terminal means of the arrester extend through this opening 19 in the plate 17. Any suitable terminal means may be provided for connecting the line conductor 15 to the arrester. As shown in detail in FIG. 6, the particular construction utilized in the present arrester includes an internally threaded boss 20 on the end cap 13 and preferably integral therewith. A connecting sleeve 21 is threaded into the boss 20 and a generally cylindrical contact member 22 is threaded on the sleeve 21. The contact member 22 may be a cylindrical steel member internally threaded at one end to engage the sleeve 21. At the other end, a plurality of contact fingers 23 are pivotally mounted on the contact member 22 and are urged radially inward by means of springs 24, the contact fingers 23 being movable to the necessary extent in radial slots in the member 22. The conductor 15 engages the spring loaded fingers 23 to effect connection to the arrester, thus providing a simple, easily engaged connecting means.

Figure 4:
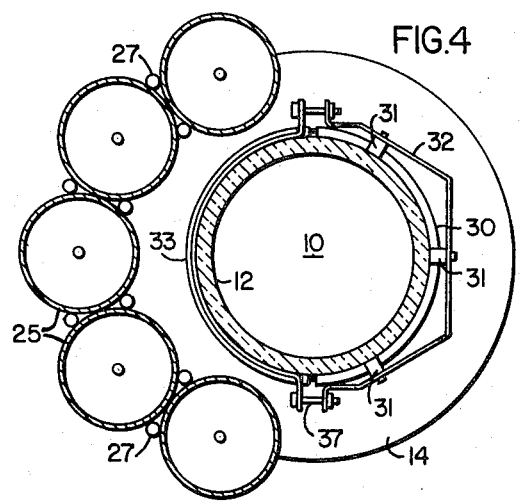
FIG. 4 is a transverse sectional view substantially on the line IV—IV of FIG. 2.
Figure 5:
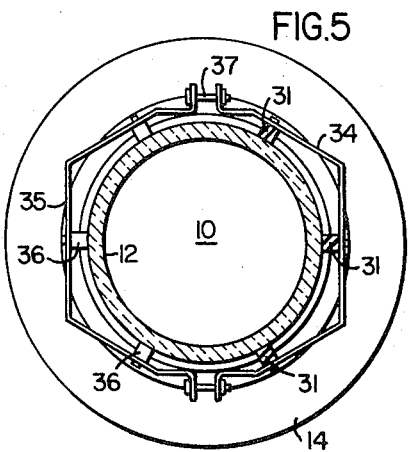
FIG. 5 is a transverse sectional view substantially on the line V—V of FIG. 2.

The asymmetrical shield itself, which is mounted on the plate 17, includes a plurality of elongated conductive members 25. The members 25 are elongated metal tubes, preferably closed at the ends as illustrated, and any necessary or desirable number may be utilized. In the embodiment shown in the drawings, five of the elongated members 25 are utilized arranged in an arc around part of the circumference of the plate 17. The members 25 are of varying length, the central one being the longest, and extending over most of the axial length of the arrester 10. The other elongated members 25 progressively decrease in length from the central member to the outer members as clearly shown in FIG. 1. The members 25 may be mechanically secured and electrically connected to the plate 17 by any suitable means such as the brackets 26 which may be welded to the members 25 and to the plate 17 to rigidly secure the members 25 to the plate. Further rigidity and support for the members 25 may be provided by short rod members 27 welded or brazed in position between the members 25 as shown in FIGS. 3 and 4. The asymmetrical shield is completed by an arcuate shield member 28 extending around the end cap 13 into contact with the members 25 and attached to the plate 17 in any suitable manner as by internal brackets 29. The arcuately arranged tubular members 25 extend almost half way around the circumference of the plate 17 and the arcuate shield 28 extends around the remaining circumferential extent of the plate 17, so that the elongated members 25 and the shield 28 together form a complete circle encircling the upper or line terminal end of the arrester. The elongated members 25 extend axially of the arrester on one side only thereof and thus form an asymmetrical shield of varying and progressively decreasing circumferential extent. As more fully explained in the above mentioned Nitta application, the voltage to ground at any point along the arrester 10 is determined by the capacitance to ground (the enclosure 11) at that point and the capacitance between the shield and the arrester, at the same point. Thus, by proper location and design of the shield the relation of the capacitances to ground and to the shield can be determined in a desired manner to control the voltage along the length of the arrester and a substantially uniform distribution of voltage can be obtained.

In order to obtain proper performance of the arrester, the field within the arrester itself must be substantially symmetrical about the center line or axis of the arrester. For this purpose, grading means are provided within the asymmetrical shield. As shown, the grading means consists of a series of conducting rings 30 disposed over the housing 12 of the arrester 10. The rings 30 are conducting rings of steel or other suitable material and are arranged in a series uniformly spaced apart from one end of the arrester to the other as clearly shown in FIGS. 1 and 2. The rings may be supported in position in any suitable manner. As illustrated, they are supported by three vertical support bars 31 extending vertically for the full length of the arrester. The bars 31 may be made of any suitable rigid insulating material and have notches positioned to engage the rings 31 and support them in position. The bars 31 are secured in position at the top of the arrester by a metal clamp 32 which engages the bars and is secured to a semi-circular clamp 33 on the opposite side of the arrester in a manner to rigidly clamp the upper ends of the bars 31 in place. At the bottom of the arrester, the bars are similarly engaged by a clamp 34 which is secured to a corresponding clamp 35 located in position by spacing blocks 36. The various clamps are held in place by bolts 37 which rigidly clamp the supporting bars 31 in place to hold the grading rings 30 in their desired positions uniformly spaced from one end of the arrester to the other. It will be seen that the rings 30 float in potential between line and ground and provide a grading means to maintain a symmetrical field within the arrester itself in order to obtain the desired performance.

As previously indicated, the bottom terminal cap 14 may be utilized as a ground terminal. The enclosure 11 is, of course, grounded and the arrester is mounted on the enclosure 11 with the terminal cap 14 electrically connected thereto.

The arrester 10 may, as previously indicated, be of any suitable or usual construction. Many arresters are provided with pressure release diaphragms or blow-out plates of various types at the lower end to permit the escape of gases which may be generated within the arrester in case of failure, so as to prevent explosion of the arrester and damage to other equipment. When an arrester provided with a pressure release means of this kind is utilized in the present invention, it is desirable to prevent contamination of the pressurized insulating gas in the enclosure by the gases escaping from the arrester and it is also desirable to maintain the integrity of the sealed enclosure to prevent escape of the insulating gas or loss of pressure in the closed system. The arrester of the present invention is therefore mounted in the enclosure 11 in a manner to accomplish these purposes. As shown in FIG. 1, the bottom plate 38 which forms the bottom wall of the enclosure 11 has a central opening 39. The arrester 10 is placed on the plate 38 in such a position that its axis is concentric with the opening 39 so that in case of failure of the arrester and release of gas from the interior of the arrester, it can escape through the opening 39. A sealing gasket 40 is placed between the end cap 14 of the arrester and the plate 38 with a central opening coextensive with the opening 39. The arrester 10 may be held in place by suitable mounting voltages or other means which will effect electrical connection to the plate 38. It will be seen that the gasket 40 effectively seals the arrester to the bottom plate 38 of the enclosure so that if the arrester should fail in service and the pressure release device should operate to permit the escape of gases generated in the arrester, the gases can escape through the opening 39 without contaminating the pressurized insulating gas in the enclosure 11 and without causing any loss of prsssure or escape of gas from the sealed enclosure. It will be understood that any suitable sealing and mounting means may be utilized to mount the arrester 10 on the bottom plate 38.

It should now be apparent that the shielded lightning arrester construction has been provided which makes it possible to obtain uniform voltage distribution across a high voltage lightning arrester enclosed in a grounded metal enclosure. This makes it possible to use arresters of standard or conventional design in a metal enclosed, gas insulated system with the same performance as in the more usual outdoor environment despite the presence of a grounded surface in close proximity to the arrester through its entire length. This result is obtained by means of the asymmetrical shield in combination with the grading rings or other means for ensuring symmetry of the electric field within the arrester itself. The particular construction disclosed is a particularly desirable arrangement for facilitating the design and manufacture of shields of this type, although it will be apparent that other specific details of construction might be utilized.

The invention has been described with particular reference to a lightning arrester but it will be apparent that other devices, such as coupling capacitors for example, may also be adversely affected by non-uniform voltage distribution and the asymmetrical shield described above may also be used with such devices to make it possible to obtain the desired performance from devices of standard construction.

We claim as our invention:

1. In combination, a grounded metal enclosure containing an insulating gas, a lightning arrester disposed within said enclosure, said arrester having line terminal means at one end thereof and ground terminal means at the other end, shielding means in conductive relation with the line terminal means, said shielding means extending toward said other end of the arrester on one side only of the arrester and being of varying length axially of the arrester, and grading means encircling the arrester for controlling the electric field within the arrester.

2. The combination of claim 1 in which said grading means comprises a series of conductive rings spaced apart and extending for substantially the entire length of the arrester.

3. The combination of claim 2 in which said shielding means includes a plurality of conducting members of differing lengths.

4. The combination of claim 2 in which said shielding means includes an arcuate member extending around one side of the arrester adjacent the line terminal means and a plurality of elongated members disposed side by side on the other side of the arrester and forming a complete circle with said arcuate member, said elongated members extending axially of the arrester toward the other end thereof, the central one of the elongated members being of greatest length and the successive members on each side of the central member being progressively shorter.

5. The combination of claim 4 in which said elongated members are metal tubes closed at both ends.

6. The combination of claim 1 in which said ground terminal means includes a conducting bottom cap having a central opening therein, and means for attaching said cap to the metal enclosure with a sealed connection, the enclosure having an opening adjacent said opening in the cap and within the sealed connection.

7. A lightning arrester adapted for use in a gas-filled, grounded metal enclosure, said arrester comprising a housing having line terminal means at one end thereof and ground terminal means at the other end thereof, asymmetrical shielding means extending axially of the arrester on one side only, grading means encircling the arrester within the shielding means, said terminal means including a conducting member for supporting said shielding means, said conducting member having contact means thereon for engaging a rigid, rod-like conductor.

8. A lightning arrester as defined in claim 7 in which said shielding means includes an arcuate member mounted on said conducting member at one side of the arrester and a plurality of elongated members mounted side by side on the conducting member at the other side of the arrester, said elongated members forming a complete circle with the arcuate member, and the elongated members extending axially of the arrester and being of different lengths.

9. A lightning arrester as defined in claim 7 in which said grading means comprises a plurality of conducting rings and means for supporting said rings in spaced relation from one end of the arrester to the other.

10. A lightning arrester as defined in claim 9 in which said shielding means includes a plurality of elongated members of varying length mounted on said conducting member at one side only of the arrester.

* * * * *